United States Patent Office 2,954,380
Patented Sept. 27, 1960

2,954,380

PIPERAZINOCYCLOHEXYL ESTERS

Seymour L. Shapiro, Hastings on Hudson, Louis Freedman, Bronxville, and Harold Soloway, Yonkers, N.Y., assignors to U.S. Vitamin & Pharmaceutical Corporation, a corporation of Delaware No Drawing. Filed Nov. 26, 1958, Ser. No. 776,425

6 Claims. (Cl. 260—268)

This invention is concerned with novel cyclohexane derivatives which have valuable physiological properties.

The cyclohexane compounds herein disclosed are represented by the bases of the following formula

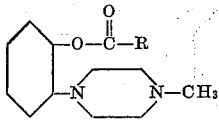

and the acid addition and quaternary ammonium salts thereof, wherein R is aryl, including phenyl, substituted phenyl, furyl, thienyl cinnamyl and phenoxyacetyl. In those instances wherein R is substituted phenyl

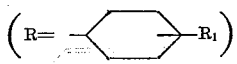

such substituents include mono-, di- and trimethoxy, lower alkyl, halogen, nitro and amino substituents on the phenyl ring.

The novel compounds of the present invention are thus 2-(1-[4-methyl]piperazino)cyclohexyl esters, and particularly those esters of the benzoic and substituted benzoic acid esters.

The compounds of this invention are depressants of the central nervous system and are also potent hypotensive agents. Such properties provide in a simple molecule the combination of properties found in the clinically used hypotensive and tranquilizer, reserpine.

This desirable combination of properties is not retained when the R group is varied as methyl, or when the methyl group on the 4-nitrogen of the piperazine ring is replaced by phenyl, or when the 4-methylpiperazino group on the 2-position of the cyclohexane ring is varied as dimethylamino, diethylamino, pyrrolidino and the like, or as a dibasic substituent as N-methyl-dimethylaminoethylamino, N-methyl-diethylaminoethylamino and N-methyl-dimethylamino.

Suitable reactants for the manufacture of the compounds of this invention are the benzoyl chloride or substituted benzoyl chloride, and the 2-(1-[4-methyl]piperazino)cyclohexanol.

The desired cyclohexanol is prepared by the reaction of N-methyl-piperazine with cyclohexane oxide according to the following equation, giving the trans amino alcohol

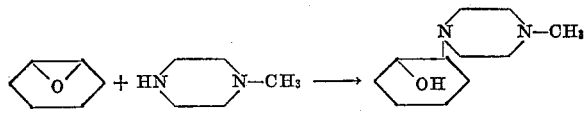

Reaction with the benzoyl chloride gives the trans ester of the amino alcohol.

The resultant esters are organic bases and form nontoxic salts with a variety of inorganic acids including hydrochloric, hydrobromic and sulfuric acids, as well as with the strong organic acids. Since the molecule has two basic sides, dibasic salts such as the dihydrochloride may be obtained.

This invention will be more fully described from the examples which follow. These examples are set forth by way of illustration only, and it will be understood that the invention is not to be construed as limited in spirit or in scope by the details contained therein, since many modifications in materials and methods will be apparent from this disclosure to those skilled in the art.

EXAMPLE 1

2-(1[4-methyl]piperazino)cyclohexanol

A mixture of 50 g. (0.5 mole) of N-methylpiperazine and 44.5 g. (0.25 mole) of cyclohexene oxide was heated under reflux for 23 hours. The excess N-methylpiperazine was removed and the residue of product was dissolved in heptene. A small quantity of insoluble material separated. After removing the solvent, the product was distilled, yielding 40.0 g. (82%) boiling at 129–131° C. at 4 mm.

The dipicrate melted at 226–228° C. (methyl ethyl ketone).

Analysis.—Calcd. for $C_{23}H_{28}N_8O_{15}$: C, 42.1; H, 4.3; N, 17.1. Found: C. 42.1; H, 4.2; N, 17.2.

EXAMPLE 2

2-(1-[4-methyl]piperazino)cyclohexyl benzoate

A solution of 8.0 g. (0.04 mole) of 2-(1-[4-methyl]-piperazino)cyclo-hexanol in 40 ml. of acetonitrile was added slowly to 5.6 g. (0.04 mole) of benzoyl chloride in 35 ml. of acetonitrile. A vigorous exothermic reaction occurred with precipitation of a white solid. After standing overnight, the solvent was removed under vacuum and the residual solid rinsed with ether and filtered, yielding 12.0 g. This was taken up in a minimum of water, made basic with continued cooling with 40% aqueous sodium hydroxide and the free base extracted with five 10-ml. portions of ether. The extracts were combined, dried (anhydrous magnesium sulfate) and filtered. After removal of the solvent and a small forerun, the product distilled at 168–172° C. at 0.11 mm., yielding 9.0 g. (75%).

Analysis.—Calcd. for $C_{18}H_{26}N_2O_2$: C, 71.5; H, 8.7; N, 9.3 Found: C, 71.7; H, 8.8; N, 8.8.

In a similar manner, using m-bromobenzoyl chloride there is obtained 2-(1-[4-methyl]piperazino)cyclohexyl m-bromobenzoate; using p-chlorobenzoyl chloride there is obtained 2-(1-[4-methyl]piperazino)cyclohexyl p-chlorobenzoate; and with p-tolyl chloride there is obtained 2-(1-[4-methyl]piperazino)cyclohexyl p-toluate.

EXAMPLE 3

2-(1-[4-methyl]piperazino)cyclohexyl o-methoxybenzoate

A solution of 8.0 g. (0.04 mole) of 2-(1-[4-methyl]-piperazino)cyclohexanol in 40 ml. of acetonitrile was slowly added to 6.8 g. (0.04 mole) of o-methoxybenzoyl chloride in 35 ml. of acetonitrile. A vigorous exothermic reaction ensued with precipitation of a white solid. After standing overnight, the solvent was removed at diminished pressure and the residue titurated with hexane to give 14.0 g. of solid. This was converted to the free base in the same manner as described in Example 2, and distilled to yield 9.3 g. (70%) boiling at 190–192° C. at 0.1 mm.

Analysis.—Calcd. for $C_{19}H_{28}N_2O_3$: C, 68.6; H, 8.5; N, 8.4. Found: C, 68.9; H, 8.0; N, 8.1.

In a similar manner, using p-methoxybenzoyl chloride there is obtained 2-(1-[4-methyl]piperazino)cyclohexyl p-methoxybenzoate, and with p-ethoxybenzoyl chloride there is obtained 2-(1-[4-methyl]piperazino)cyclohexyl p-ethoxybenzoate.

EXAMPLE 4

*2 - (1 - [4 - methyl]piperazino)cyclohexyl 3,4,5 - trimethoxybenzoate dihydrochloride*

To a solution of 6.9 g. (0.03 mole) of 3,4,5-trimethoxybenzoyl chloride in 60 ml. of acetonitrile was slowly added a solution of 6.0 g. (0.03 mole) of 2-(1-[4-methyl]piperazino)cyclohexanol in 40 ml. of acetonitrile. An exothermic reaction occurred with formation of a white precipitate. The reaction mixture was heated under reflux with stirring for 7 hours. When cool, the solvent was removed at diminished pressure, the residue triturated with pentane and the resulting solid (12.5 g.) dissolved in water. This solution was made basic with 40% aqueous sodium hydroxide and the free base extracted with five 20-ml. portions of ether. After drying (magnesium sulfate), the solvent was removed and the oil distilled to remove material boiling below 200° C. at 0.2 mm. The residue was dissolved in ether (100 ml.) and hydrogen chloride admitted with cooling. A white precipitate of the dihydrochloride formed. Filtration yielded 7.0 g. (50%) which was recrystallized (methyl ethyl ketone-ethanol) to give the product, melting at 220–223° C.

*Analysis.*—Calcd. for $C_{21}H_{35}Cl_2N_2O_5$: N, 6.0. Found: N, 5.5.

EXAMPLE 5

*2 - (1 - [4 - methyl]piperazino)cyclohexyl p-nitrobenzoate hydrochloride*

A solution of 10.0 g. (0.05 mole) of 2-(1-[4-methyl]piperazino)cyclohexanol in 50 ml. of acetonitrile was slowly added to 9.3 g. (0.05 mole) of p-nitrobenzoyl chloride in 50 ml. of acetonitrile, inducing a vigorous exothermic reaction. After allowing the reaction mixture to stand 24 hours at room temperature and then refrigerating, the solid was filtered off, yielding 10.0 g., M.P. 206–208° C. An additional 4.0 g. was recovered from the filtrate on evaporation and trituration with ether.

Recrystallization from ethanol gave 8.5 g. (42%) of the monohydrochloride hemidrate, melting at 216–218° C.

*Analysis.*—Calcd. for $C_{18}H_{26}ClN_3O_4 \cdot \frac{1}{2}H_2O$: C, 55.0; H, 6.9; N, 11.0. Found: C, 55.1; H, 7.0; N, 10.8.

EXAMPLE 6

*2 - (1 - [4 - methyl]piperazino)cyclohexyl p-aminobenzoate hydrochloride*

2-(1-[4-methyl]piperazino)cyclohexyl p-nitrobenzoate monohydrochloride hemihydrate (7.7 g., 0.02 mole) was dissolved in 250 ml. of 75% aqueous ethanol, 0.2 g. of platinum dioxide added and the mixture hydrogenated in a Parr hydrogenator at room temperature. After 8 hours, the theoretical quantity of hydrogen was consumed. Filtration and removal of the solvent gave a brown gum which was triturated with ether to yield 6.2 g. (81%). Recrystallization (methyl ethyl ketone-ethanol) gave 2.5 g. (33%) of the sesquihydrate, decomposing at 164° C.

*Analysis.*—Calcd. for $C_{18}H_{28}ClNO_3 \cdot 1.5 H_2O$: C, 56.8; H, 8.2; N, 11.0. Found: C, 57.2; H, 8.7; N, 11.0.

A dipicrate was prepared and recrystallized from a mixture of methanol, acetone and water, decomposing at 239–241° C.

*Analysis.*—Calcd. for $C_{30}H_{33}N_9O_{16}$: C, 46.5; H, 4.3; N, 16.3. Found: C, 46.4; H, 4.4; N, 16.0.

It is to be understood that it is intended to cover all changes and modifications of the examples of the invention herein chosen for the purpose of illustration which do not constitute departures from the spirit and scope of the invention.

We claim:

1. The cyclohexyl ester of the following formula

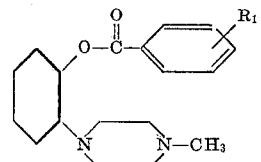

wherein $R_1$ is a member of the group consisting of hydrogen, methyl, amino, nitro, halogen, methoxy and trimethoxy.

2. The compound

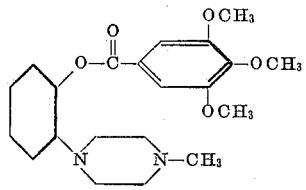

3. The compound of claim 1, the free base, wherein $R_1$ is 2-methoxy.

4. The compound of claim 1, the free base, wherein $R_1$ is 4-amino.

5. The compound of claim 1, the free base, wherein $R_1$ is 4-nitro.

6. The compound of claim 1, the free base, wherein $R_1$ is hydrogen.

References Cited in the file of this patent

Godchot et al.: Comptes Rendus, vol. 194, pp. 616–617 (1932).

Shriner et al.: Identification of Organic Compounds, pp. 159–160, 3rd ed. (1948).